(12) United States Patent
Hur

(10) Patent No.: US 9,700,817 B2
(45) Date of Patent: Jul. 11, 2017

(54) FLUID-FORWARDING SLUDGE-DISCHARGE DEVICE FOR SETTLEMENT BASIN

(71) Applicant: Jong Hyung Hur, Ulsan (KR)

(72) Inventor: Jong Hyung Hur, Ulsan (KR)

( * ) Notice: Subject to any disclaimer, the term of this patent is extended or adjusted under 35 U.S.C. 154(b) by 112 days.

(21) Appl. No.: 14/434,120

(22) PCT Filed: Oct. 8, 2013

(86) PCT No.: PCT/KR2013/008973
§ 371 (c)(1),
(2) Date: Apr. 8, 2015

(87) PCT Pub. No.: WO2014/058203
PCT Pub. Date: Apr. 17, 2014

(65) Prior Publication Data
US 2015/0265946 A1    Sep. 24, 2015

(30) Foreign Application Priority Data

Oct. 9, 2012  (KR) ......................... 10-2012-0111863

(51) Int. Cl.
*B01D 21/24*    (2006.01)
*B01D 21/18*    (2006.01)
*C02F 1/52*    (2006.01)

(52) U.S. Cl.
CPC ......... *B01D 21/2472* (2013.01); *B01D 21/18* (2013.01); *C02F 1/52* (2013.01)

(58) Field of Classification Search
CPC  B01D 21/18; B01D 21/2472; B01D 21/2477; B01D 21/245
USPC .......................... 210/523, 524, 533, 534, 803
See application file for complete search history.

(56) References Cited

U.S. PATENT DOCUMENTS

| 2,267,608 | A | * | 12/1941 | Hawley | ................ | B01D 21/245 |
| | | | | | | 210/523 |
| 2,732,944 | A | * | 1/1956 | Hays | .................... | B01D 21/245 |
| | | | | | | 210/534 |
| 4,913,819 | A | * | 4/1990 | Patterson | ........... | B01D 21/2466 |
| | | | | | | 210/523 |

(Continued)

FOREIGN PATENT DOCUMENTS

| JP | 10-324987 A | 12/1998 |
| JP | 2002-361003 A | 12/2002 |

(Continued)

OTHER PUBLICATIONS

International Search Report for PCT/KR2013/008973 mailed Nov. 27, 2013 from Korean Intellectual Property Office.

*Primary Examiner* — Christopher Upton
(74) *Attorney, Agent, or Firm* — Paratus Law Group, PLLC

(57) ABSTRACT

A fluid-forwarding sludge-discharge device for a settlement basin, the device including: a pressurized water spraying unit of which one end is disposed adjacent to the floor of the settlement basin; a sludge suction cover which is disposed on an upper part of the floor such that the lower part thereof covers the upper part of the sludge-receiving unit in a state having an open box shape and collection guide plates which are provided joined to the floor of the settlement basin and guide the sludge being moved by means of the pressurized water spraying unit such that the sludge flows towards the sludge inflow recess.

6 Claims, 3 Drawing Sheets

(56) References Cited

U.S. PATENT DOCUMENTS

| | | | | |
|---|---|---|---|---|
| 5,176,838 A * | 1/1993 | Chin | ................... | B01D 21/2472 210/525 |
| 2004/0222170 A1* | 11/2004 | Hauge | ................ | B01D 21/2472 210/523 |
| 2008/0006304 A1* | 1/2008 | Treherne | ............ | B01D 21/2472 210/513 |

FOREIGN PATENT DOCUMENTS

| KR | 10-2008-0097846 A | 11/2008 |
|---|---|---|
| KR | 20-0450574 Y1 | 10/2010 |
| KR | 10-2012-0108401 A | 10/2012 |

\* cited by examiner

FLUID-FORWARDING SLUDGE-DISCHARGE DEVICE FOR SETTLEMENT BASIN

CROSS REFERENCE TO PRIOR APPLICATION

This application is a National Stage Patent Application of PCT International Patent Application No. PCT/KR2013/008973 (filed on Oct. 8, 2013) under 35 U.S.C. §371, which claims priority to Korean Patent Application No. 10-2012-0111863 (filed on Oct. 9, 2012) which are all hereby incorporated by reference in their entirety.

TECHNICAL FIELD

The present invention relates to a fluid-forwarding sludge-discharge device tar settlement basin, and more particularly, to a fluid-forwarding sludge-discharge device for settlement basin which is installed in a circular settlement basin of purification plant or sewage treatment plant or the like and moves the sludge so that the sludge can be discharged to the outside.

BACKGROUND ART

In general, in a process of treating raw water such as sewage and waste water discharged from industrial site (hereinafter, referred to as raw water), for conservation of water quality on discharging the raw water, the raw water is treated at a terminal end part of a discharge channel and thereafter discharged to the outside. If the raw water introduced from general home or industrial site undergoes chemical treatment while being stored in a circular sludge collector for a certain period of time, impurities mixed in the raw water sinks down to a bottom of the collector and sludge, i.e. precipitate that has sunk down to the bottom, is collected and moved by a scraper contacting with a bottom surface and then discharged to the outside through a sludge outlet, and overlying water other than the sludge is treated with chemicals and thereafter discharged to a river. The sludge settled on the bottom surface of the circular sludge collector is rapidly discharged to the outside and removed through the sludge outlet for preventing anaerobic degeneration of the sludge that drastically degrades the water quality over time, and thus purification of the raw water is smoothly achieved.

Such a circular sludge collector of the settlement basin includes a rotary unit for removing sludge having a circular body with an open top end, a raw water-supplying part configured to supply the raw water into the body, a center cage rotatably installed outside a raw water-supplying pipe of the raw water-supplying part, and a scraper joined to the center cage for scraping and moving the sludge while rotating; a cylindrical feed wall fixedly installed above the center cage and guiding the raw water so that the raw water flows downwards while contacting with an inner circumferential surface of a side wall; a turntable fixedly installed on an upper end portion of the center cage for rotation of the center cage; a drive fixedly installed at one inner end portion of a bridge for walking passage and having a driving motor provided with a reduction gear installed on a shaft for rotation of the turntable; and a sludge-discharging pipe connected to a sludge-receiving unit formed at a central part of the button surface described later of the body.

However, since there is a civil constructional problem that it is difficult to maintain a uniform gap between the scraper provided on one side or both sides of the circular sludge collector of the conventional settlement basin and a bottom part which is a concrete structure, a mechanical rotational force is driven using an elastic scraper made from flexible rubber or the like. Therefore, a problem arises of damage to the scraper due to non-uniform friction between the scraper and the bottom surface and of increase of cost for facility management due to excessively many machines or equipment structures. Moreover, another problem arises that part of the sludge is not removed from the sludge-discharging unit and the bottom surface, and there is yet another problem that the deposited sludge, which has not been removed, becomes anaerobic and thus is decomposed and cannot be smoothly discharged to the outside through the sludge-discharging pipe. Further, the maintenance such as repair or the like is difficult since the discharging pipe and inflow pipe have to be buried in a lower part of the settlement basin, which pipes are buried from a central part of the settlement basin structure to an underground outside the structure.

SUMMARY OF THE INVENTION

Technical Problems

The present invention has an object of providing a fluid-forwarding sludge-discharge device for settlement basin which allows settled sludge to be discharged to a sludge-receiving unit of the settlement basin without any congestion area.

Solution to the Problem

The present invention provides a fluid-forwarding sludge-discharge device for settlement basin which moves sludge settled on a bottom of the settlement basin to a sludge-receiving unit formed at a central part of the bottom, comprising: a pressurized water-spraying unit which sprays the pressurized water to the sludge settled in the settlement basin to move the sludge to the sludge-receiving an while one end of the pressurized water-spraying unit is positioned adjacent to the bottom of the settlement basin; a sludge suction cover which is in the form of box with an open lower end and is disposed on the bottom so as to cover an upper part of the sludge-receiving unit, wherein a sludge inflow recess is formed through a side surface of the cover and thus the cover guides the sludge moved by the pressurized water-spraying unit so that the sludge flows in through the sludge inflow recess and thereafter moves to the sludge-receiving unit; and collection guide plates which are disposed on and joined to the bottom of the settlement basin and guide the sludge moved by the pressurized water-spraying unit so that the sludge flows into the sludge inflow recess.

Further, the pressurized water-spraying unit may include a pump; a pressurized water supplying line which is connected to the pump and supplied with the pressurized water pressurized from the outside by the pump; pressurized water-distributing lines, one end of each of the lines being connected to the pressurized water-supplying line and the other end being positioned adjacent to the bottom of the settlement basin; and a plurality of spraying nozzles which are formed on the pressurized water-distributing lines while being spaced apart from each other and which spray the pressurized water to the bottom of the settlement basin to move the sludge in a direction toward the sludge-receiving unit.

Further, a plurality of the sludge inflow recesses may be formed in the side surface of the sludge suction cover while being spaced apart from each other.

Further, the collection guide plates may be disposed on and joined to the bottom of the settlement basin to divide the bottom into a plurality of sections, while being positioned between two adjacent sludge inflow recesses, and wherein the end of each collection guide plate facing the sludge suction cover is positioned adjacent to an outer surface of the sludge suction cover.

Further, the fluid-forwarding sludge-discharge device for settlement basin may further include a cover-rotating unit which is connected to the sludge suction cover and rotates the sludge suction cover in a horizontal direction.

Further, the cover-rotating unit may include a connecting bar whose one longitudinal end is connected and joined to an upper part of the sludge suction cover; and a driving motor which has a rotational shaft connected to the other longitudinal and of the connecting bar and which generates a rotational driving force for rotating the connecting bar.

Further, the sludge, suction cover may be provided with an opening/closing gate joined thereto which opens and closes the sludge inflow recess.

Further, the opening/closing gate may include an opening/closing plate disposed on one side of the sludge suction cover so as to be slidable in the direction of the sludge inflow recess; and an opening/closing cylinder disposed at the sludge suction cover and having a rod with one end connected to the opening/closing plate, by means of which rod the cylinder reciprocally slides the opening/closing plate to open and close the sludge inflow recess.

Effects of the Invention

A according to the fluid-forwarding sludge-discharge device for settlement basin of the one embodiment, in the state where the sludge suction cover is disposed to so as cover the sludge-receiving unit of the settlement basin, the sludge moved by the pressurized water sprayed from the pressurized water-spraying unit is collected by the collection guide plates and then flows into the inside of sludge suction cover through the sludge inflow recesses and thereafter moves to the sludge-receiving unit, whereby the sludge can be easily discharged to the outside without any congestion.

BEST MODES FOR CARRYING OUT THE INVENTION

Hereinafter, preferred embodiments of the present invention will be described in detail with reference to the attached drawings.

Figure 1:
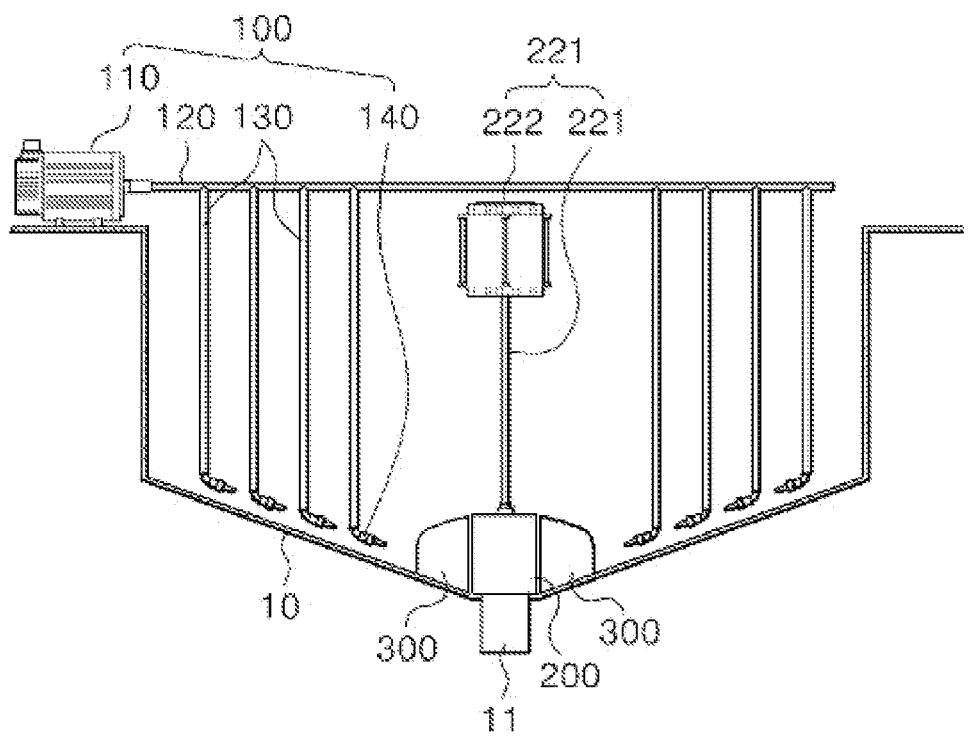
FIG. 1 is a constructional cross-sectional view of a fluid-forwarding sludge-discharge device for settlement basin according to one embodiment of the present invention.

FIG. 1 is a constructional cross-sectional view of a fluid-forwarding sludge-discharge device for settlement basin according to one embodiment of the present invention. Referring to FIG. 1, the fluid-forwarding sludge-discharge device for settlement basin includes a pressurized water-spraying unit (100), a sludge suction cover (200) and collection guide plates (300) and is installed in the settlement basin (10) which discharges the sludge settled on its bottom through a sludge-receiving unit (11) formed at a central part of the bottom. Herein, the settlement basin (10) may have a circular shape, but of course, is not limited to such a shape. Further, in the settlement basin (10), a mud-discharging valve or pump (not illustrated) or the like may be installed while being connected to the sludge-receiving unit (11) for facilitating the suction and discharge of the sludge through the sludge-receiving unit (11).

The pressurized water-spraying unit (100) causes the sludge settled on the bottom of the settlement basin (10) to move in a direction toward the sludge-receiving unit (11). That is, the pressurized water-spraying unit (100) spray-discharges the pressurized water in the bottom of the settlement basin (10) in the state of being installed in the settlement basin (10) and thus pushes and moves the sludge on the bottom of the settlement basin (10) so that the sludge can flow into the sludge-receiving unit (11). Herein, the pressurized water-spraying unit (100) includes a pump (110), a pressurized water-supplying line (120), pressurized water-distributing lines (130) and spraying nozzles (140).

The pump (110) generates a moving pressure by which the pressurized water of the bottom of the settlement basin (10) to be spray-discharged can be spray-supplied to the bottom of the settlement basin (10). Such a pump (110) is installed on one side of the settlement basin (10), with an outlet port of the pump being connected to one longitudinal end of the pressurized water-supplying line (120). In this connection, the pump (110) may be installed outside the settlement basin (10) or may be installed such that the pump can be lifted and lowered while being suspended inside the settlement basin (10). Herein, fluid as the pressurized water pumped by the pump (110) may be separately supplied from the outside or overlying water of the settlement basin (10) may be optionally used for the fluid.

The pressurized water-supplying line (120) is a connection pipe member which guides the pressurized water pressurized by the pump (110) to feed the pressurized water to the pressurized water-distributing lines (130). The one longitudinal end of the pressurized water-supplying line (120) is connected to the outlet port of the pump (110) and the other end is connected to inlet ends of the pressurized water-distributing lines (130).

The pressurized water-distributing lines (130) are pipe members which divide the pressurized water received from the pressurized water-supplying line (120) in a plurality of lines so that the pressurized water can be efficiently sprayed inside the settlement basin (10). In other words, one end of each pressurized water-distributing line (130) is connected and joined to the other end of the pressurized water-supplying line (120), and the other end is arranged in a plurality of lines branched to the settlement basin (10). Herein, the other ends of the pressurized water-distributing lines (130) may be positioned adjacent to the bottom or a side surface of the settlement basin (10) or may be positioned such that tip ends of the spraying nozzles (140) protrude into the inside of the settlement basin (10), while being buried in the bottom surface or side surface of the settlement basin (10). Moreover, the pressurized water-distributing lines (130) may be provided with control valves (not illustrated in the drawings) so that the pressurized water can be selectively supplied to the respective branched lines.

Inside the settlement basin (10) the spraying nozzles (140) spray-discharge the pressurized, water, which has been supplied to the pressurized water-distributing lines (130), in the direction toward the sludge-receiving unit (11). A plurality of such spraying nozzles (140) are formed on the pressurized water-distributing lines (130) while being spaced apart from each other. Herein, the tip parts of the spraying nozzles (140) are formed so as to direct the spray-discharged pressurized water in the direction toward an inlet of the sludge-receiving unit (11). Therefore, when the pressurized water is spray-discharged from the spraying nozzles (140), the sludge settled on the bottom of the settlement basin (10) can be moved in the direction toward the sludge-receiving unit (11).

The sludge suction cover (200) guides sludge moved in the direction toward the sludge-receiving unit (11) by the pressurized water sprayed from the pressurized water-spraying unit (100) so that the sludge can accurately flow into the sludge-receiving unit (11). In other words, the sludge suction cover (200) guides the sludge so that the sludge can directly flow into the sludge-receiving unit (11), without moving to an opposite side respect to the sludge-receiving unit (11), while being more to the sludge-receiving unit (11) by a spray force of the pressurized water Herein, the sludge suction cover (200) rests on an upper surface of the bottom of the settlement basin (10) so as to cover an upper part of the sludge-receiving unit (11). Further, referring to FIG. 2, the sludge suction cover (200) is in the form of box whose lower end facing the sludge-receiving unit (11) is open so that the cover communicates with the sludge-receiving unit (11) while being disposed on the upper surface of the bottom of the settlement basin (10).

Further, formed through a side surface of the sludge suction cover (200) is a sludge inflow recess (210) which allows the inside and outside or the sludge suction cover (200) to communicate with each other while the sludge suction cover (200) rests on the bottom of the settlement basin (10). Such a sludge inflow recess (210) guides the sludge moved in the direction toward the sludge-receiving unit (11) by the pressurized water sprayed through the spraying nozzles (140) of the pressurized water-spraying unit (100) so that the sludge can flow into the inside of the sludge suction cover (200) from the outside thereof and thereafter moves into the sludge-receiving unit (11). Herein, at least one sludge inflow recess (210) is formed in the side surface of the sludge suction cover (200). In a case where a plurality of the sludge inflow recesses are formed, the recesses are arranged apart from each other, whereby the sludge moved by the pressurized water sprayed from the spraying nozzles (140) of all the pressurized water-distributing lines (130) of the pressurized water-spraying unit (100) can flow into the inside of the sludge suction cover (200).

Moreover, the sludge inflow recess (210) is formed so as to be open to a lower part of the sludge suction cover (200), namely, so as to be in communication with the open lower part of the sludge suction cover (200). Thus, the sludge can flow into the inside of the sludge suction cover (200) through the sludge inflow recess (210) without any obstruction while the sludge suction cover (200) rests on the bottom of the settlement basin (10).

Further, in a case where only one sludge inflow recess (210) is formed in the side surface of the sludge suction cover (200), a cover-rotating unit (220) may be provided which rotates the sludge suction cover (200) in its place so that the sludge moved by the pressurized water-distributing lines (130) sequentially spraying the pressurized water can flow into the inside of the sludge suction cover (200). The cover-rotating unit (220) includes a connecting bar (221) and a driving motor (222).

The connecting bar (221) is a shaft member which transmits a rotational force generated by the driving motor (222) to the sludge suction cover (200). One longitudinal end of the connecting bar (221) is connected and joined to an upper part of the sludge suction cover (200) and the other end is connected and joined to a rotational shaft of the driving motor (222).

The driving motor (222) generates a rotational driving force so that the sludge suction cover (200) can rotate while resting on the bottom of the settlement basin (10). The rotational shaft of the driving motor (222) is connected and joined to the other end of the connection bar (221).

As such, by the rotational force generated by driving of the driving motor (222) being transmitted to the connecting bar (221), the sludge suction cover (200) is rotated and accordingly the sludge inflow recess (210) formed in the side surface of the cover is changed in its position, and thus the sludge can flow into the sludge inflow recess (130) from any selected pressurized water-distributing line (130) from which the pressurized water is sprayed.

Figure 3:
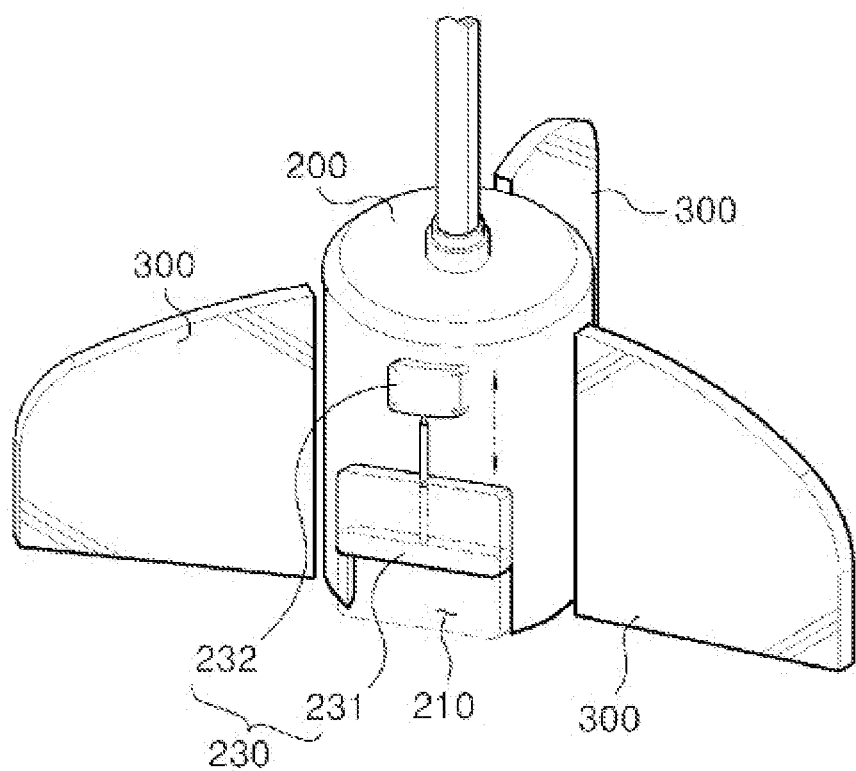
FIG. 3 is a perspective view of another embodiment of the sludge suction cover shown in FIG. 1.

Further, the sludge suction cover (200) may be provided with opening/closing gates (230) which open and close the sludge inflow recesses (210). Referring to FIG. 3, the opening/closing gates (230) close other sludge inflow recesses (210) except for the sludge inflow recess (210) into which the sludge moved by spraying of the pressurized water flows, thus keeping a pressure inside the sludge suction cover (200) low; therefore, the sludge which has flowed into the inside of the sludge suction cover (200) can be stably prevented from being discharged back to the settlement basin (10) through the sludge inflow recess (210). The opening/closing gates (230) include opening/closing plates (231) and opening/closing cylinders (232).

The opening/closing plates (231) are slidably disposed in the side surface of the sludge suction cover (200) in a number corresponding to the sludge inflow recesses (210). At this time, each of the opening/closing plates (231) is disposed at the sludge suction cover (200) so as to be slidable in the direction of the sludge inflow recess (210).

Each of the opening/closing cylinders (232) is joined to the sludge suction cover (200) and has a rod with one end connected to the opening/closing plate (231). Thus, depending on change of a length of the rod by operation of the opening/closing cylinder (232), the opening/closing plate (231) is slidably reciprocated to open and close the sludge inflow recess (210).

The collection guide plates (300) guide the sludge moved by the pressurized water sprayed from the spraying nozzles (140) of the pressurized water-spraying unit (100) so that the sludge flows into the sludge inflow recess (210) of the sludge suction cover (200). In other words, the collection guide plates (300) serve to collect the sludge pushed and moved by the pressurized water so that the sludge is not dispersed or does not move past the sludge suction cover (200). As such, the collection guide plates (300) guide the sludge settled on the bottom of the settlement basin (10) so that the sludge directly flows into the sludge-receiving unit (11) through the sludge inflow recess (210) of the sludge suction cover (200), without moving to the opposite side of the sludge-receiving unit (11), while being moved to the sludge-receiving unit (11) by spraying of the pressurized water.

The collection guide plates (300) are disposed on and joined to the bottom of the settlement basin (10) so as to protrude upwards from the bottom. Herein, a plurality of the collection guide plates (300) are disposed to divide the bottom of the settlement basin (10) into a plurality of sections. In this connection, each of the collection guide plates (300) is positioned between two adjacent sludge inflow recesses (210) of the sludge suction cover (200). Further, the end of each collection guide plate (300) facing an outer surface of the sludge suction cover (200) is positioned adjacent to the outer surface of the sludge suction cover (200). Thereby, the sludge, which has been guided by the collection guide plates (300), can be prevented from leaking through between an end of the sludge suction cover (200) and outer surfaces of the collection guide plates (300).

As such, the collection guide plates (300) are differently formed depending on the number of the sludge inflow recesses (210). In other words, in a case where a plurality of the sludge inflow recesses (210) are formed in the side surface of the sludge, suction cover (200), a plurality of the collection guide plates (300) may be disposed on and joined to the bottom of the settlement basin (10) so as to be positioned between the sludge inflow recesses (210). As such the collection guide plates (300) block both right and left sides of each sludge inflow recesses (210), respectively, and obstruction to the inflow by interference does not occur when the sludge flows into each sludge inflow recess (210).

Figure 2:
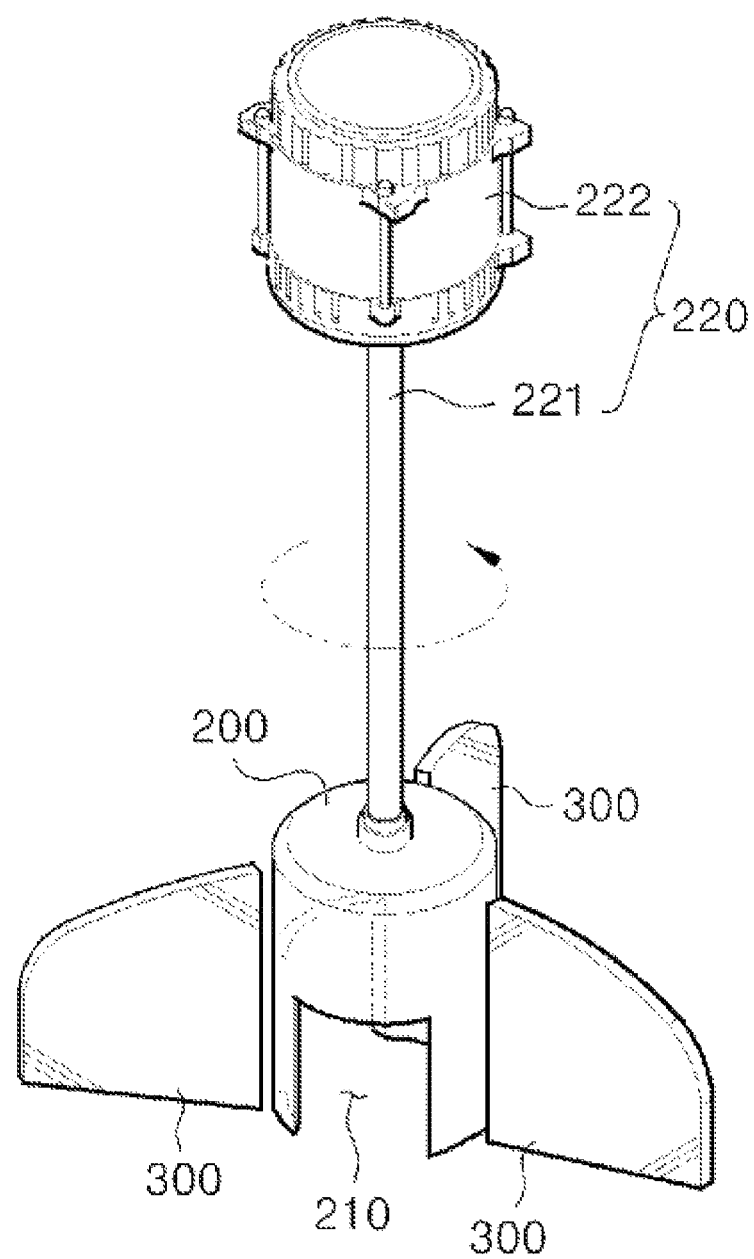
FIG. 2 is a perspective view of sludge suction cover shown in FIG. 1.

Hereinafter, referring to FIGS. 1 to 3, operation of the fluid-forwarding sludge-discharge device for settlement basin according to the one embodiment constructed as above will be described.

First, when the sludge is accumulated on the bottom of the settlement basin (10), the pump (110) of the pressurized water-spraying unit (100) to spray-discharge the pressurized water in the settlement basin (10). In other words, the pressurized water pressurized by the pump (110) is distributed from the pressurized water-supplying line (120) to the pressurized water-distributing lines (130) and thereafter is sprayed to the bottom of the settlement basin (10) through the spraying nozzles (140), and thus the sludge is pushed and moved in the direction toward the sludge-receiving unit (11) of the settlement basin (10).

Then, the sludge flows into the inside of the sludge suction cover (200) through the sludge inflow recess (210) of the sludge suction cover (200) and thereafter is discharged to the outside through the sludge-receiving unit (11). At this time, the sludge pushed and moved on the bottom of the settlement basin (10) by the pressurized water is collected by the collection guide plates (300) and then flows into the sludge inflow recess (210).

As such, according to the fluid-forwarding sludge-discharge device for settlement basin of the one embodiment, in the state where the sludge suction cover (200) is disposed to so as cover the sludge-receiving unit (11) of the settlement basin (10), the sludge moved by the pressurized water sprayed from the pressurised water-spraying unit (100) is collected by the collection guide plates (300) and then flows into the inside of sludge suction cover (200) through the sludge inflow recesses (210) and thereafter moves to the sludge-receiving unit (11), whereby the sludge can be easily discharged to the outside without any congestion.

Although the present invention has been described with reference to the embodiment illustrated in the drawings, the embodiment is merely illustrative, and those skilled in the art would appreciate that various modifications and other equivalent embodiments are possible. Therefore, the true technical scope of protection of the present invention should be defined by the technical concept of the appended claims.

What is claimed is:

1. A fluid-forwarding sludge-discharge device for settlement basin which moves sludge settled on a bottom of the settlement basin to a sludge-receiving unit formed at a central part of the bottom, comprising:
   a pressurized water-spraying unit which sprays pressurized water to the sludge settled in the settlement basin to move the sludge to the sludge-receiving unit while one end of the pressurized water-spraying unit is positioned adjacent to the bottom of the settlement basin;
   a sludge suction cover which is in the form of box with an open lower end and is disposed on the bottom so as to cover an upper part of the sludge-receiving unit, wherein a sludge inflow recess is formed through a side surface of the cover and thus the cover guides the sludge moved by the pressurized water-spraying unit so that the sludge flows in through the sludge inflow recess and thereafter moves to the sludge-receiving unit; and
   collection guide plates which are disposed on and joined to the bottom of the settlement basin and guide the sludge moved by the pressurized water-spraying unit so that the sludge flows into the sludge inflow recess,
   wherein a plurality of the sludge inflow recesses are formed in the side surface of the sludge suction cover while being spaced apart from each other,
   wherein the collection guide plates are disposed on and joined to the bottom of the settlement basin to divide the bottom into a plurality of sections, while being positioned between two adjacent sludge inflow recesses, and
   wherein an end of each collection guide plate facing the sludge suction cover is positioned adjacent to an outer surface of the sludge suction cover.

2. The fluid-forwarding sludge-discharge device for settlement basin according to claim 1, wherein the pressurized water-spraying unit comprises:
   a pump;
   a pressurized water-supplying line which is connected to the pump and supplied with the pressurized water pressurized from the outside by the pump;
   pressurized water-distributing lines, wherein one end of each of the lines is connected to the pressurized water-supplying line and the other end is positioned adjacent to the bottom of the settlement basin; and
   a plurality of spraying nozzles which are formed on the pressurized water-distributing lines while being spaced apart from each other and which spray the pressurized water to the bottom of the settlement basin to move the sludge in a direction toward the sludge-receiving unit.

3. A fluid-forwarding sludge-discharge device for settlement basin which moves sludge settled on a bottom of the settlement basin to a sludge-receiving unit formed at a central part of the bottom, comprising:
   a pressurized water-spraying unit which sprays pressurized water to the sludge settled in the settlement basin to move the sludge to the sludge-receiving unit while one end of the pressurized water-spraying unit is positioned adjacent to the bottom of the settlement basin;
   a sludge suction cover which is in the form of box with an open lower end and is disposed on the bottom so as to cover an upper part of the sludge-receiving unit, wherein a sludge inflow recess is formed through a side surface of the cover and thus the cover guides the sludge moved by the pressurized water-spraying unit so that the sludge flows in through the sludge inflow recess and thereafter moves to the sludge-receiving unit;
   collection guide plates which are disposed on and joined to the bottom of the settlement basin and guide the sludge moved by the pressurized water-spraying unit so that the sludge flows into the sludge inflow recess; and
   a cover-rotating unit which is connected to the sludge suction cover and rotates the sludge suction cover in a horizontal direction.

4. The fluid-forwarding sludge-discharge device for settlement basin according to claim 3, wherein the cover-rotating unit comprises a connecting bar whose one longitudinal end is connected and joined to an upper part of the sludge suction cover; and a driving motor which has a rotational shaft connected to the other longitudinal end of the connecting bar and which generates a rotational driving force for rotating the connecting bar.

5. A fluid-forwarding sludge-discharge device for settlement basin which moves sludge settled on a bottom of the settlement basin to a sludge-receiving unit formed at a central part of the bottom, comprising:
- a pressurized water-spraying unit which sprays the pressurized water to the sludge settled in the settlement basin to move the sludge to the sludge-receiving unit while one end of the pressurized water-spraying unit is positioned adjacent to the bottom of the settlement basin;
- a sludge suction cover which is in the form of box with an open lower end and is disposed on the bottom so as to cover an upper part of the sludge-receiving unit, wherein a sludge inflow recess is formed through a side surface of the cover and thus the cover guides the sludge moved by the pressurized water-spraying unit so that the sludge flows in through the sludge inflow recess and thereafter moves to the sludge-receiving unit; and
- collection guide plates which are disposed on and joined to the bottom of the settlement basin and guide the sludge moved by the pressurized water-spraying unit so that the sludge flows into the sludge inflow recess,
- wherein the sludge suction cover is provided with an opening/closing gate joined thereto which opens and closes the sludge inflow recess.

6. The fluid-forwarding sludge-discharge device for settlement basin according to claim 5, wherein the opening/closing gate comprises an opening/closing plate disposed on one side of the sludge suction cover so as to be slidable in the direction of the sludge inflow recess; and an opening/closing cylinder disposed at the sludge suction cover and having a rod with one end connected to the opening/closing plate, by means of which rod the cylinder reciprocally slides the opening/closing plate to open and close the sludge inflow recess.

* * * * *